United States Patent [19]

Szegu et al.

[11] Patent Number: 5,316,750

[45] Date of Patent: May 31, 1994

[54] HYDROCARBON COMBUSTION PROCESS IN WHICH THE CARBON DIOXIDE PRODUCED IS PREVENTED FROM DISPERSING ONTO THE ATMOSPHERE, AND A PLANT FOR ITS IMPLEMENTATION

[76] Inventors: Eduardo Szegu, Via Cardano 8, Milan; Giuseppe Biardi, Via Casartelli 7, Malnate (Varese), both of Italy

[21] Appl. No.: 724,938

[22] Filed: Jul. 2, 1991

[30] Foreign Application Priority Data

Jul. 5, 1990 [IT] Italy ................ 20370 A/90

[51] Int. Cl.$^5$ .................... C01B 31/02; C09C 1/48
[52] U.S. Cl. .................... 423/451; 423/449.1; 431/10
[58] Field of Search ............ 431/5, 9, 10; 423/450, 423/451, 458, 445, 449.1

[56] References Cited

U.S. PATENT DOCUMENTS

| | | | |
|---|---|---|---|
| 1,520,093 | 12/1924 | Shapleigh | 423/522 |
| 2,672,402 | 3/1954 | Stokes | 423/450 |
| 2,992,075 | 7/1961 | de Galocsy | 423/458 |
| 3,172,729 | 9/1961 | de Galocsy | 423/458 |
| 3,914,091 | 10/1975 | Yamagishi et al. | 431/10 |

FOREIGN PATENT DOCUMENTS

| | | | |
|---|---|---|---|
| 1467447 | 9/1969 | Fed. Rep. of Germany | C09C 1/48 |
| 0023616 | 3/1981 | Japan | 431/5 |
| 319233 | 2/1984 | U.S.S.R. | C09C 1/48 |

OTHER PUBLICATIONS

Olsen, *Unit Processes & Principles of Chemical Engineering* Di Van Nostrand, Inc. (1932).
Yamagishi et al., "A Study of NO$_x$ Combustion" *JSME*, vol. 17, No. 112, pp. 1305–1312 (1974).

*Primary Examiner*—John Zimmerman
*Assistant Examiner*—Stephen G. Kalinchak
*Attorney, Agent, or Firm*—Cushman, Darby & Cushman

[57] ABSTRACT

A process for the combustion of a hydrocarbon, such as methane, in particular for energy production, in which the hydrocarbon, which will be assumed to be methane, is fed to a first stage in which it is reacted with recycled carbon dioxide produced during a separate, second stage of the combustion. In the first stage, the following reactions takes place:

$$CH_4 + CO_2 \rightarrow 2CO + 2H_2 \quad (1)$$

$$CH_4 + CO_2 \rightarrow 2C + 2H_2O \quad (2)$$

$$CO_2 + H_2 \rightarrow CO + H_2O \quad (3)$$

The carbon produced in the reaction (2) is separated, and the gaseous mixture produced in said first stage is then fed to a second stage for reaction with oxygen, in which the reaction products are steam and carbon dioxide, this carbon dioxide, minus any excess, being totally recycled to said first stage.

3 Claims, 1 Drawing Sheet

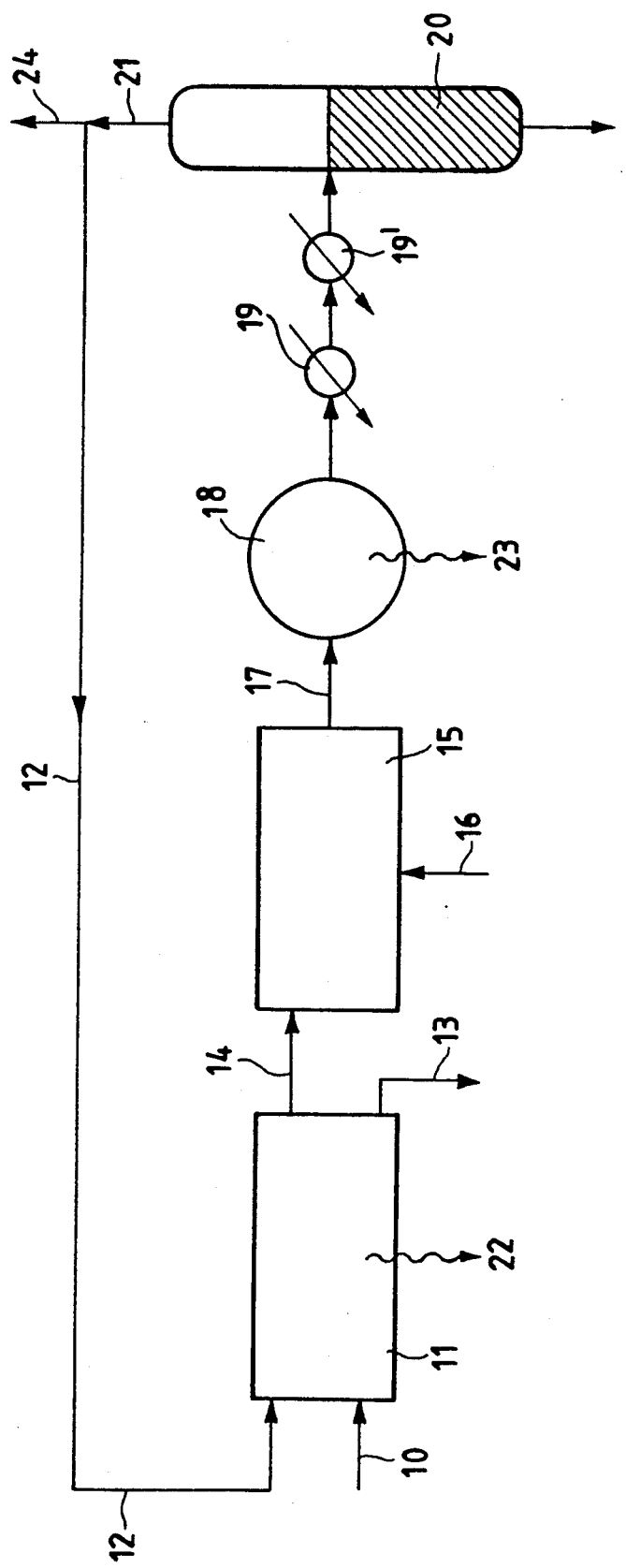

HYDROCARBON COMBUSTION PROCESS IN WHICH THE CARBON DIOXIDE PRODUCED IS PREVENTED FROM DISPERSING ONTO THE ATMOSPHERE, AND A PLANT FOR ITS IMPLEMENTATION

BACKGROUND OF THE INVENTION

It is well known that in processes involving the combustion of liquid and gaseous hydrocarbons (such as methane) for the large-scale production of thermal and electrical energy, such as in thermoelectric power stations, one of the currently most serious problems is the release to atmosphere of the correspondingly large quantities of carbon dioxide produced by the combustion. Much comment has recently been made on the serious environmental problem of imbalance between the emission of $CO_2$ into the atmosphere and the reuse of the same $CO_2$ in the biosphere. In other words, the rate of combustion of carbon-based fossil fuels exceeds the rate of carbon fixation by photosynthesis in plants.

While fossil fuels (coal, natural gas and petroleum) constitute the main source of energy, it will not be possible to stop their production, although their consumption may have to be rationalized, even though it is probable that other forms of energy will be available in the future. Faced with the ecological risk associated with excess $CO_2$ in the atmosphere, it has, for example, been proposed to increase the efficiency of direct utilization of solar energy or photosynthesis by selected microorganisms which fix the $CO_2$ and produce fuels (solar bioreactor).

However such a project has still to be developed and tried, and at the moment it is only a hypothetical solution.

SUMMARY OF THE INVENTION

In contrast, the present invention proposes a concrete solution to this technical problem, which can be implemented quickly on an industrial scale.

To attain this object, together with further advantages which will be apparent from the ensuing description, the present invention provides a process for the combustion of a hydrocarbon, such as methane, in particular for energy production, characterised in that the hydrocarbon, for instance methane, is fed to a first stage in which it is reacted with the carbon dioxide produced during the combustion. In the first stage, the following reactions take place:

$$CH_4 + CO_2 \rightarrow 2CO + 2H_2 \quad (1)$$

$$CH_4 + CO_2 \rightarrow 2C + 2H_2O \quad (2)$$

$$CO_2 + H_2 \rightarrow CO + H_2O \quad (3),$$

the carbon produced in the reaction (2) is separated and the gaseous mixture produced in the first stage is then fed to a second stage for reaction with oxygen, in which the reaction products are steam and carbon dioxide, this latter being totally recycled to said first stage.

The first stage of the process according to the invention is conducted at a pressure chosen between 1 and 50 bar, and a temperature chosen between 500° and 800° C., and preferably between 600° and 700° C. at a pressure of between 10 and 40 bar.

BRIEF DESCRIPTION OF THE DRAWING

The process of the invention is described in greater detail hereinbelow with reference to the figure of the accompanying drawing, which represents a schematic flow diagram of the process.

DETAILED DESCRIPTION

The schematic diagram shown is to be considered purely a non-limiting example of the invention.

With reference to the drawing figure, it will be assumed that in a plant for producing energy by combustion of methane 10, that the methane is fed to a first stage 11 in which, under temperature and pressure conditions chosen within the ranges of 500° to 800° C. (preferably 600° to 700° C.) and 1 to 50 bar (preferably 10 to 40 bar), the methane reacts with the carbon dioxide fed to the stage 11 via a flow line 12.

The aforestated reactions (1), (2) and (3) take place in this stage, with the production of carbon (C), for example carbon black, in accordance with the reaction:

$$CH_4 + CO_2 \rightarrow 2C + 2H_2O \quad (2)$$

the carbon black being separated, collected and stored via line 13 as a useful product.

Upon leaving the stage 11, the gaseous mixture produced in stage 11, and consisting of $H_2$, CO and $H_2O$, plus the $CH_4$ and $CO_2$ unreacted in this first stage, is fed via a line 14 to a second stage 15, to which pure oxygen is fed via line 16.

Total combustion of CO, $H_2$ and $CH_4$ takes place in this second stage, with the formation of $H_2O$ and $CO_2$. The mixture containing these products of the reaction of the stage 15 is fed via line 17 to a steam boiler 18, and then through a recuperator 19 and a condenser 19' for separation of water, which is collected in collector vessel 20. The $CO_2$ which separates from the water leaves the collector vessel 20 through the line 21 and is totally recycled to the first stage 11 via the flow line 12.

The reference numeral 24 on the schematic diagram indicates a purging line.

Finally, the reference numerals 22 and 23 respectively represent the amount of heat produced in the stage 11 and the amount of heat recovered for steam production in the boiler 18.

With reference to the drawing figure, one example of the implementation of the process according to the invention is described hereinafter, but is in no way to be considered as limitative thereof.

EXAMPLE

This example, includes process operating conditions and quantities. The methane stream (10) is preheated to 600° C. and fed to the first stage at a pressure of 30 atm (absolute). A unit flow rate (1 kmole/u.t.) is assumed for this stream as reference.

After heating, the recycle $CO_2$ is also fed to the first stage in a quantity of 1 kmole of $CO_2$ per kmole of $CH_4$.

The operating conditions of the first stage and the manner of contact between the two gaseous streams enable thermodynamic equilibrium to be attained with excellent approximation at 600° C. and 30 atm.

The gaseous outflow (14) has the following composition:

| | |
|---|---|
| CO | 0.05987 kmoles/kmole of entering $CH_4$ |

| | -continued |
|---|---|
| CO₂ | 0.52252 kmoles/kmole of entering CH₄ |
| H₂ | 0.25456 kmoles/kmole of entering CH₄ |
| H₂O | 0.89509 kmoles/kmole of entering CH₄ |
| CH₄ | 0.42517 kmoles/kmole of entering CH₄ |

The solid outflow (13), i.e. carbon in the form of carbon black, is produced in a quantity of 0.99244≃1 kmole/kmole of entering CH₄. Under these operating conditions, the first stage requires a power input Q of 5155.5 kcal/kmole of entering CH₄, which is easily obtainable from the sensible heat of the gas leaving the second stage. The gaseous mixture (14) is fed to the second stage (16), to which oxygen in a quantity of 1 kmole/kmole of entering CH₄ is fed after being preheated and compressed to a pressure of 30 atm.

Stoichiometric combustion occurs, resulting in a gaseous product consisting of CO₂ (1 kmole) and H₂O (2 kmole) at high temperature. This gas enters the boiler (18) and then passes through a system of heat recuperators (19) designed to preheat the CH₄, O₂ and the recycle CO₂. The gas energy is recovered down to a temperature of 100° C., giving a total recovered heat quantity (23) in both boiler and recuperators of 133,883 kcal/kmole of CH₄ feed.

The condenser (19') for final steam removal precedes the separation unit (20) for separating the recycle CO₂ (21) from the water, which is discharged from the plant.

A purging line (24) is provided in the recycle line to prevent accumulation of inert gases or gases in excess of the stoichiometric ratio.

Taking account of the heat recovery along the cycle for preheating the reactants, but ignoring the ineffective enthalpy of the stream leaving the recuperators at 100° C., the net energy withdrawn from the circuit (22+23) is 110,974 kcal/kmole of CH₄.

From the aforegoing description and example it is apparent that in an effective and industrially advantageous manner, the process of the invention allows the CO₂ produced in methane combustion processes to be totally recycled, so completely preventing their release to the atmosphere.

In this respect, in the first stage a recoverable and industrially useful product in the form of carbon, for example carbon black, is obtained.

After removal of the carbon black, the second stage provides complete oxidation of the synthesis gases from the first stage using pure oxygen. This second stage is strongly exothermic and represents the main stage in terms of the energy produced by the process of the invention. The use of oxygen instead of air is imposed by the need not to dilute the combustion products, and in particular the carbon dioxide, which has to be completely recycled.

Thus, the combination of the two stages is essential in the proposed process, i.e., precipitation of carbon in the form of carbon black, followed by oxidation with oxygen, these together enabling the energy of the hydrogen contained in the hydrocarbon to be utilized while recovering the carbon.

The pressure and temperature to be used in the first stage also depend on the initial pressure of the natural gas fuel as available, and also on the equilibria of the transformation reactions.

It can therefore be stated that the invention basically provides for reducing the CO₂ formed during the oxidation of liquid and gaseous fuels, by so to speak halting the combustion at the hydrogen and storing or otherwise using the carbon, in the form, for example, of carbon black.

This storage is seen as an effective although temporary solution while awaiting the solution to at least a part of the overall energy problem, for example by fusion reactors, by the perfection of solar bioreactors, or by other alternative energy means. Furthermore, it preserves the high energy potential unchanged. It should be noted that although the process of the invention can be effectively applied in particular to combustion processes in energy production stations such as thermoelectric power stations, it is also applicable to carbon black production plants, even though in this case the CO₂ produced and dispersed into the atmosphere is in a much lower quantity than that involved in thermoelectric power stations.

A further considerable advantage of the invention is that it allows convenient recovery of at least part of the energy because of the overall exothermic balance of the process when operating at a temperature and pressure suitably chosen within the aforedefined ranges.

Another considerable advantage of this invention is that, using pure oxygen in the combustion reaction of the second stage (and not air), there is no formation of nitrogen oxides and thus no emission of pollutant gases into the environment.

We claim:

1. A process for combusting methane for producing energy, comprising:

in a first stage, partially reacting at a temperature in the range of from 500° to 800° C., feed streams consisting essentially of methane and carbon dioxide, wherein said carbon dioxide is produced in a second stage, thereby causing the following reactions to occur:

$$CH_4 + CO_2 \rightarrow 2CO + 2H_2 \qquad (1)$$

$$CH_4 + CO_2 \rightarrow 2C + 2H_2O \qquad (2)$$

$$CO_2 + H_2 \rightarrow CO + H_2O \qquad (3)$$

in which the C is present as carbon and the CH₄, CO₂, CO, H₂ and H₂O are present as a gaseous mixture;

separating the carbon from the gaseous mixture and forwarding the gaseous mixture to said second stage;

in said second stage, completely combusting the CH₄, CO and H₂ in said gaseous mixture with oxygen in an absence of nitrogen and thereby converting said gaseous mixture into a converted gaseous mixture of CO₂ and H₂O;

separating the H₂O from said converted gaseous mixture to obtain a stream of CO₂; and totally recycling said stream of CO₂ to said first stage, but for excess CO₂, which is purged from said stream upstream of said first stage.

2. The process of claim 1, wherein:

while said methane is being partially reacted with carbon dioxide in said first stage, said first stage is maintained at a pressure which is in the range of 1 to 50 bar.

3. The process of claim 1, wherein:

while said methane is being partially reacted with carbon dioxide in said first stage, said first stage is maintained at a pressure which is in the range of 10 to 40 bar and at a temperature which is in the range of 600° to 700° C.

* * * * *

UNITED STATES PATENT AND TRADEMARK OFFICE
CERTIFICATE OF CORRECTION

PATENT NO. : 5,316,750
DATED : May 31, 1994
INVENTOR(S) : Szego et al.

It is certified that error appears in the above-indentified patent and that said Letters Patent is hereby corrected as shown below:

On title page, item [19] "Szegu et al" should read --Szego et al--
item [76] Inventors: should read --Eduardo Szego, Via Cardano 8, Milan; Giuseppe Biardi, Via Casartelli 7, Malnate (Varese), both of Italy Signed and Sealed this Sixteenth Day of August, 1994

Attest:

BRUCE LEHMAN

Attesting Officer  Commissioner of Patents and Trademarks